US00RE37484B1

(19) United States
(12) Reissued Patent
Gerber

(10) Patent Number: US RE37,484 E
(45) Date of Reissued Patent: Dec. 25, 2001

(54) CLAMPING DEVICE FOR MACHINE TOOLS

(75) Inventor: Ernst Gerber, Reigoldswil (CH)

(73) Assignee: Rego-Fix AG, Reigoldswil (CH)

(21) Appl. No.: 09/422,112

(22) PCT Filed: Sep. 13, 1994

(86) PCT No.: PCT/CH94/00180

§ 371 Date: Jul. 14, 1995

§ 102(e) Date: Jul. 14, 1995

(87) PCT Pub. No.: WO95/07791

PCT Pub. Date: Mar. 23, 1995

Related U.S. Patent Documents

Reissue of:
(64) Patent No.: 5,904,451
Issued: May 18, 1999
Appl. No.: 08/433,488
Filed: Jul. 14, 1995

(30) Foreign Application Priority Data

Sep. 14, 1993 (CH) ..... 92757/93

(51) Int. Cl.[7] ..... B23B 51/06; B23B 31/20
(52) U.S. Cl. ..... 408/56; 279/20; 279/46.4; 279/46.9; 408/57
(58) Field of Search ..... 279/20, 46.2–46.4, 279/46.9, 48, 49, 56, 157; 408/56, 57, 59, 60; 409/136

(56) References Cited

U.S. PATENT DOCUMENTS

| | | | | |
|---|---|---|---|---|
| 4,423,880 | * | 1/1984 | Kosmowski | 279/46.4 |
| 4,725,064 | * | 2/1988 | Glimpel et al. | 279/46.2 |
| 4,817,972 | * | 4/1989 | Kubo et al. | 279/48 |
| 5,028,178 | * | 7/1991 | Ronen | 279/20 |
| 5,405,220 | * | 4/1995 | Ishikawa | 279/20 |

FOREIGN PATENT DOCUMENTS

| | | | |
|---|---|---|---|
| 2139437 | * | 10/1972 | (DE) . |
| 3600445 | * | 7/1986 | (DE) . |

* cited by examiner

*Primary Examiner*—Steven C. Bishop
(74) *Attorney, Agent, or Firm*—Bryan Cave LLP

(57) ABSTRACT

A clamping device has a collet or a sleeve that contains an inner coolant supply. The non-through parts of the clamping device have formed therein radial slits and/or intermediate slits that open at the machine side and/or the tool side of the shank of the device. The slits and non-through parts of the device are arranged in such a way that they form a coolant barrier.

14 Claims, 3 Drawing Sheets

CLAMPING DEVICE FOR MACHINE TOOLS

Matter enclosed in heavy brackets [ ] appears in the original patent but forms no part of this reissue specification; matter printed in italics indicates the additions made by reissue.

BACKGROUND OF THE INVENTION

The invention relates to a clamping device between a tool shank and a machine tool. The invention relates in particular to a clamping device for cutting tools with an internal coolant supply.

The cutting principally of metals on machine tools (drills, millers, lathes) is carried out using, inter alia, cutting tools which feed the coolant directly to the cutting edge through a bore in the tool shank in order to lengthen the service life of the tool and improve its cutting capacity.

Such cutting tools usually have a round shank which is clamped in the tool holder by means of a suitable collet chuck or clamping sleeve, provided with slots for flexibility, and is thus secured against twisting. As these cutting tools with an internal coolant supply can easily be made to rotate at speeds of 40,000 rpm, enhanced cooling of the operation is essential. To improve the cooling, the pressure at which the coolant is injected is therefore increased to as much as 50 bar or more. Now, if a tool with an internal coolant supply is connected to the machine tool by means of a collet chuck or clamping sleeve, a large part of the cooling fluid is lost through the slots in the unsealed collet chuck or clamping sleeve.

To prevent this, the slots in the collet chuck or clamping sleeve have hitherto been filled with an elastic compound such as rubber, although the chucking capacity was then lost, or the tensioning nut was sealed by means of a washer, a solid sealing ring or a packing, or rubber pegs were inserted in specially made bores in the slots in the collet chuck or clamping sleeve. The disadvantages of these variants are that for every shaft or tool shank diameter there must be a washer of corresponding diameter or a packing available, and that the sealing rings or rubber pegs are no longer certain to form a seal at today's high cooling fluid pressures and are attacked by the various coolants. The greatest disadvantage of these variants, however, is that a collet chuck or clamping sleeve which had to be sealed required additional components.

The object of the invention is therefore to provide a clamping device which forms a perfect seal against the escape of fluids from machine tools, even at high pressures of up to 150 atm, and substantially retains its flexibility, and which is effective without additional sealing components and can nevertheless be used in conventional machine tools.

SUMMARY OF THE INVENTION

Based on a device of the type described at the outset, the aforesaid object is achieved according to the invention by the provision of a collet chuck or clamping sleeve whose non-through parts of the radial slots or intermediate slots are fixed on the one hand to the tool shank and on the other hand at least partially to the collet chuck or clamping sleeve housing in such a way as to form a coolant barrier together with the tool shank and the collet chuck housing. Radial pressure on the external contour of the collet chuck or clamping sleeve, or axial pressure by means of a tensioning nut in the case of a conical collet chuck, forms coolant-tight metal—metal seals between tool shank, collet chuck or clamping sleeve and collet chuck or clamping sleeve housing, so the pressurized coolant can only escape in the tool direction via the bore provided for this purpose in the tool shank.

Alternatively, the embodiment with slots open on the machine side can be avoided by using intermediate slots closed on both sides. Again, with this embodiment of the invention, the coolant can only escape in the cutting tool direction via the bore provided for this purpose in the tool shank.

It is preferable to use double-slotted collet chucks, the distinguishing feature of which is that the slots are cut into the collet chucks alternately from the opposite sides, although it is also possible to use collet chucks with intermediate slots, i.e. with slots which are closed at both ends of the collet chuck or clamping sleeve. Advantageously, such a collet chuck or clamping sleeve then only has slots open on the cutting tool side, so there are no longer any tightness problems on the machine side because there are no open slots. To improve the flexibility of these collet chucks or clamping sleeves as well, it is advantageously possible to provide them additionally with an outflow.

The collet chucks or clamping sleeves are conventionally made of hardened spring steel, tool steel or beryllium bronze so that the radial slots give them a degree of flexibility when mechanical or hydraulic pressure is applied. Their shape can be either that of a cylinder or that of a cone, double cone or cone/cylinder combination.

The collet chucks or clamping sleeves can have a bore at the machine end if the tool shank has a small diameter, this usually being unnecessary in the case of tool shanks of larger diameter.

Examples are illustrated in greater detail with the aid of the Figures below.

DESCRIPTION OF ILLUSTRATED EMBODIMENTS

Figure 1:
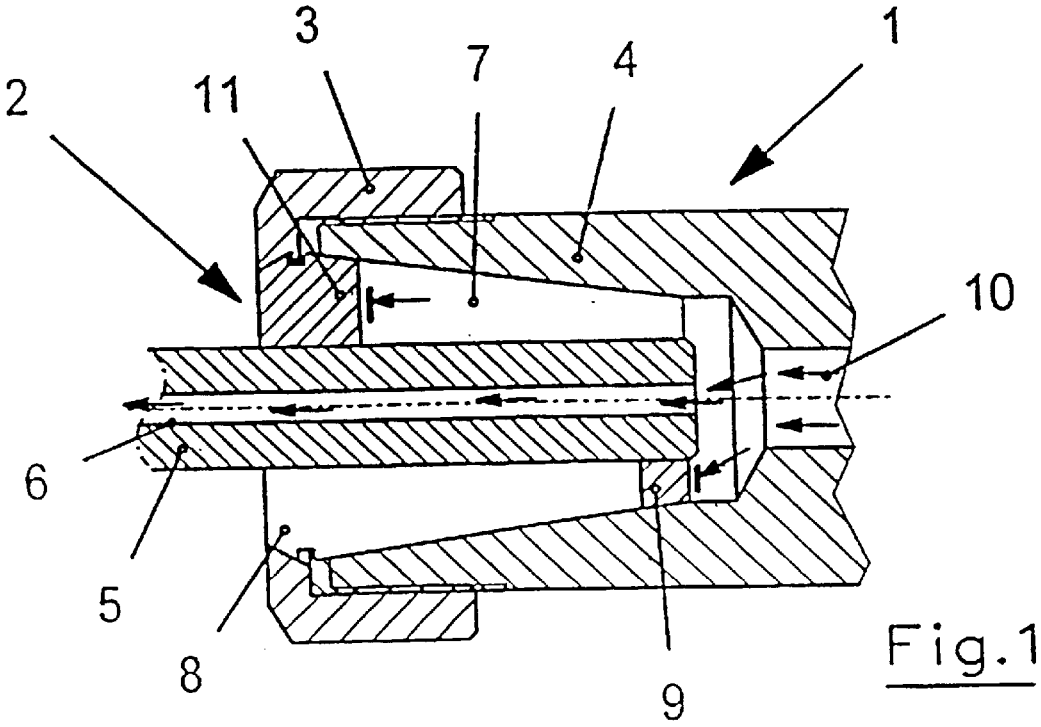
FIG. 1 shows a section through a clamping device comprising a conical collet chuck without a bore.

FIG. 1 shows a clamping device (1) which has a conical collet chuck (2). The collet chuck (2) is fixed in the collet chuck housing (4) by means of the tensioning nut (3). When the tensioning nut (3) is fixed, said collet chuck is increasingly pushed into the conical collet chuck housing (4), exerting an axial pressure on the tool shank (5) so that the later is in turn firmly fixed in the collet chuck housing (4). The tool shank (5) has a bore (6) for the internal coolant supply. The flexibility of the collet chuck (2), which is a functional requirement, is achieved by means of *axially extending* radial slots (7, 8) in the collet chuck (2). Some of the slots (7) are cut into the collet chuck (2) on the machine side and some of the slots (8) are cut on the cutting tool side. These slots are preferably made in such a way that the best possible flexibility can be achieved and the greatest possible clamping force can be transferred to the tool shank (5). The slots (7) cut into the collet chuck (2) on the machine side have a specific length. This is determined by the length of the collet chuck housing (4), the non-through parts (11), together with the tool shank (5) and the collet chuck housing (4), acting as a barrier against the escape of the coolant (10) from the clamping device (1). As the slots (8) cut into the collet chuck (2) on the tool side also have non-through parts (9), which form an analogous barrier to the coolant (10), the coolant can only escape through the bore (6) to its destination at the cutting tool. Through the arrangement and length of the slots (7, 8), the labyrinth of slots is interlocked so that the coolant (10) no longer has a free and continuous exit which would enable it to escape unhindered through the slots (7, 8).

If it is desired to increase the flexibility of the collet chuck (2), the slots (7, 8) will be made longer or the non-through parts (9, 11) will be kept shorter than in the case where the flexibility of the collet chuck (2) is of less significance.

Figure 2:
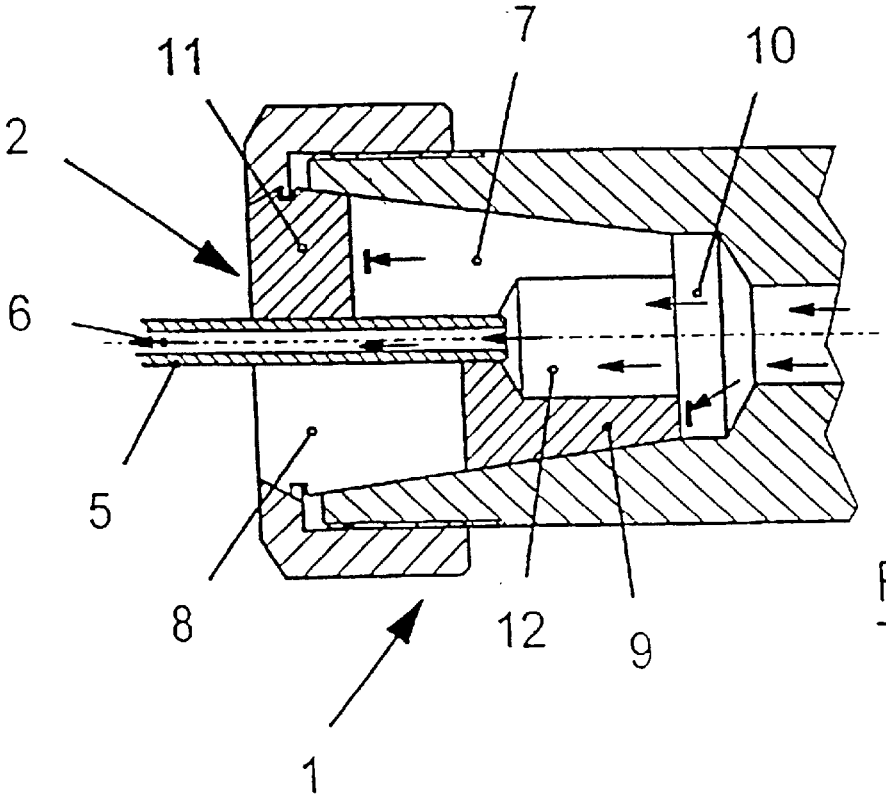
FIG. 2 shows a section through a clamping device comprising a conical collet chuck with a bore.

FIG. 2 shows a similar clamping device to that shown in FIG. 1. The essential difference is in the additional arrangement of a bore (12) *at the machine side of the chuck (2) as shown in FIG. 2*, which is used especially in the case of collet chucks suitable for tool shanks (5) of small diameter. Furthermore, in such a case, the non-through part (9) is greatly enlarged so that this part can be fixed tightly to the tool shank in order to prevent coolant from escaping.

Figure 3:
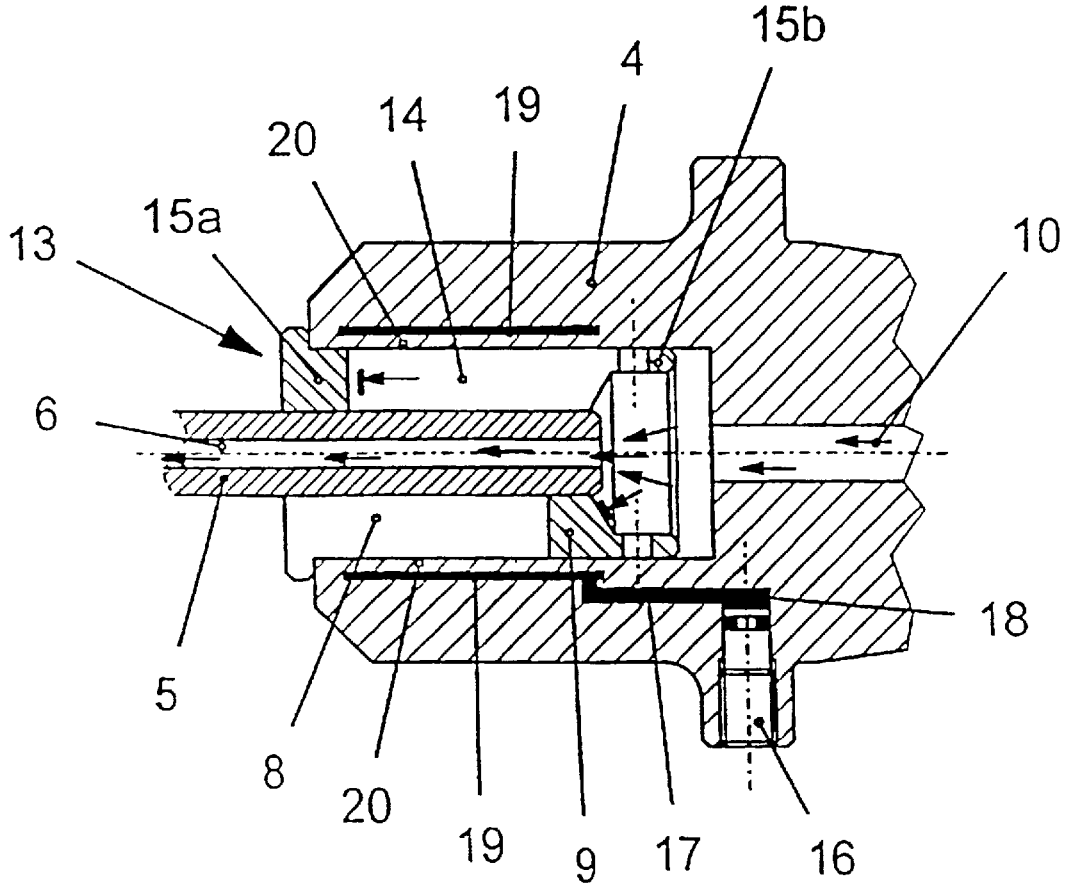
FIG. 3 shows a section through a clamping device comprising a cylindrical clamping sleeve with hydraulic clamping.

FIG. 3 shows a clamping sleeve (13) which is clamped hydraulically. The clamping sleeve (13) has on the one hand slots (8) cut on the cutting tool side and on the other hand intermediate slots (14) having one non-through part at each end, (15a) and (15b). When the screw (16) is tightened, the hydraulic oil (17) is pushed out of the reservoir (18) into the cylindrical cavity (19) in the clamping sleeve housing (4) so that the thin walls (20) between the cavity (19) and the clamping sleeve (13) are pressed elastically inwards, thereby fixing the clamping sleeve (13) in the clamping sleeve housing (4).

Figure 4B:
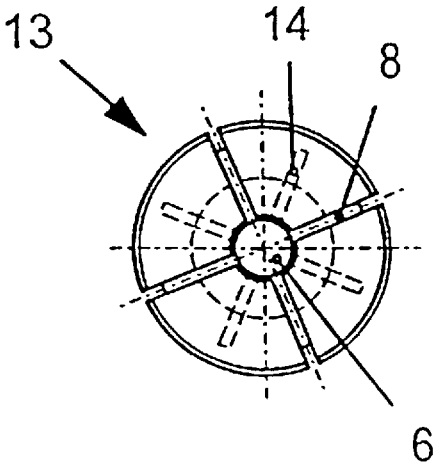
FIG. 4b shows a perspective view of the cylindrical clamping sleeve of FIG. 4a from the front.
Figure 4A:
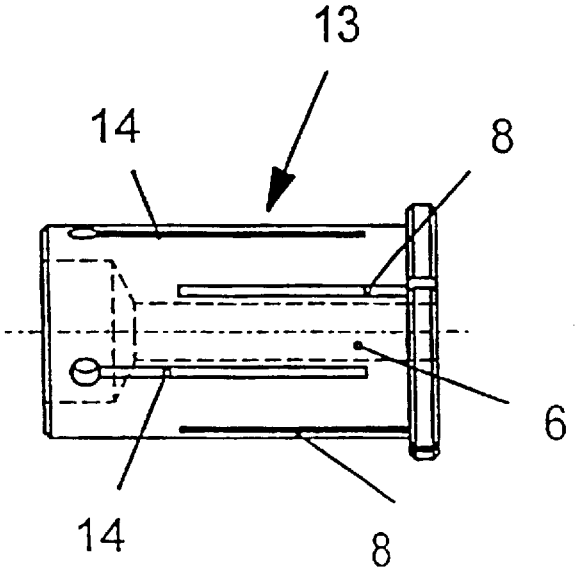
FIG. 4a shows a perspective side-view of a cylindrical clamping sleeve.
Figure 5B:
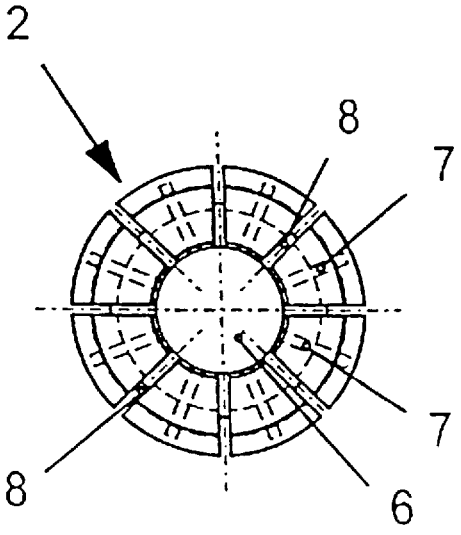
FIG. 5b shows a perspective view of the conical collet chuck of FIG. 5a from the front.
Figure 5A:
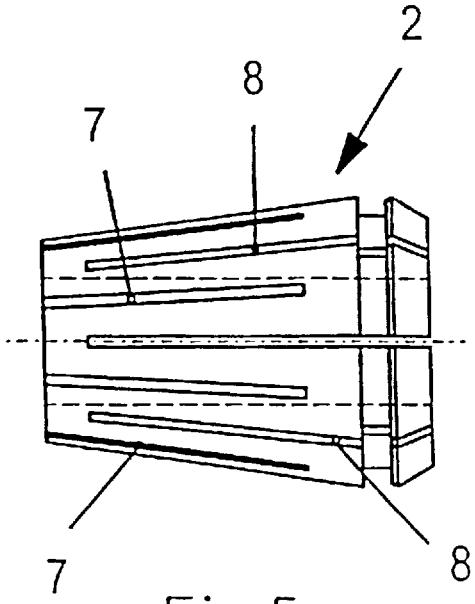
FIG. 5a shows a perspective side-view of a conical collet chuck.

The significance of the cylindrical clamping sleeve (13) shown in FIG. 4a and 4b and the conical collet chuck (2) shown in FIG. 5a and 5b can easily be deduced from the previous Fig. and therefore does not need to be illustrated in greater detail.

What is claimed is:

1. A clamping device for placement between a tool shank with a bore and a machine tool having an internal coolant supply, the device comprising a sleeve element extending along an axis and a sleeve housing, characterized in that at least one of the sleeve element and the sleeve housing have formed therein a plurality of axially extending radial slots which open onto a machine side of the device and a plurality of axially extending intermediate slots, wherein one of the intermediate slots is neither open onto the tool side of the device nor open onto a machine side of the device, and wherein the intermediate slots, the radial slots, the tool shank and the sleeve housing form a coolant barrier that prevents the flow of coolant from the device except through the bore.

2. A clamping device according to claim 1, characterized in that the sleeve element is made of a material selected from the group consisting of hardened spring steel, tool steel and beryllium bronze.

3. A clamping device according to claim 1, characterized in that the sleeve element has a bore.

4. A clamping device according to claim 1, characterized in that the sleeve element is mechanically fixed within the device and about the tool shank.

*5. A clamping device for placement between a tool shank with a bore and a machine tool having an internal coolant supply, the device comprising a sleeve element extending along an axis and a sleeve housing, characterized in that at least one of the sleeve element and the sleeve housing have formed therein a plurality of axially extending radial slots which open onto a tool side of the device and a plurality of axially extending intermediate slots, wherein one of the intermediate slots is neither open onto the tool side of the device nor open onto a machine side of the device, and wherein the intermediate slots, the radial slots, the tool shank and the sleeve housing form a coolant barrier that prevents the flow of coolant from the device except through the bore.*

*6. A clamping device for placement between a tool shank with a bore and a machine tool having an internal coolant supply, the device comprising a sleeve element extending along an axis and a sleeve housing, characterized in that the sleeve element has formed therein a plurality of axially extending radial slots which open onto a tool side of the device and a plurality of axially extending intermediate slots, wherein one of the intermediate slots is neither open onto the tool side of the device nor open onto a machine side of the device, and wherein the intermediate slots, the radial slots, the tool shank and the sleeve housing form a coolant barrier that prevents the flow of coolant from the device except through the bore.*

*7. A clamping device for placement between a tool shank with a bore and a machine tool having an internal coolant supply, the device comprising a sleeve element extending along an axis and a sleeve housing, characterized in that the sleeve element has formed therein a plurality of axially extending radial slots which open onto a machine side of the device and a plurality of axially extending intermediate slots, wherein one of the intermediate slots is neither open onto the tool side of the device nor open onto a machine side of the device, and wherein the intermediate slots, the radial slots, the tool shank and the sleeve housing form a coolant barrier that prevents the flow of coolant from the device except through the bore.*

*8. A clamping device for placement between a tool shank with a bore and a machine tool having an internal coolant supply, the device comprising a sleeve element extending along an axis and a sleeve housing, characterized in that at least one of the sleeve element and the sleeve housing have formed therein a plurality of axially extending radial first slots which open onto a machine side of the device and a plurality of axially extending radial second slots which open onto a tool side of the device, wherein the radial slots, the tool shank and the sleeve housing form a coolant barrier that prevents the flow of coolant from the device except through the bore.*

*9. A clamping device for placement between a tool shank with a bore and a machine tool having an internal coolant supply, the device comprising a sleeve element extending along an axis and a sleeve housing, characterized in that the sleeve element has formed therein a plurality of axially extending first radial slots which open onto a machine side of the device and a plurality of axially extending second radial slots which open onto a tool side of the device, wherein the radial slots, the tool shank and the sleeve housing form a coolant barrier that prevents the flow of coolant from the device except through the bore.*

*10. A clamping device between a tool shank and a machine tool, especially a cutting tool with an internal coolant supply, comprising a collet chuck and a collet chuck housing or a clamping sleeve and a clamping sleeve*

*housing, characterized in that the collet chuck or clamping sleeve has axially extending radial slots, at least some of which open on one side only of the chuck or sleeve and that the slots define non-through parts that are fixed to the tool shank and at least partially to the collet chuck housing or clamping sleeve housing in such a way as to form a coolant barrier together with the tool shank and with that housing.*

*11. A clamping device according to claim 10, characterized in that the collet chuck or clamping sleeve has radial slots open in alternating sequence on the tool side and on the machine side.*

*12. A clamping device according to claim 10, characterized in that the collet chuck or clamping sleeve is fixed mechanically or hydraulically to the chuck housing or sleeve housing, respectively.*

*13. A clamping device between a tool shank and a machine tool, especially a cutting tool with an internal coolant supply, comprising a collet chuck and a collet chuck housing or a clamping sleeve and a clamping sleeve housing, characterized in that the collet chuck or clamping sleeve has axially extending radial slots, at least some of which open on one side only of the chuck or sleeve and others of which are intermediate and are open at neither end, and that the slots define non-through parts that are fixed to the tool shank and at least partially to the collet chuck housing or clamping sleeve housing in such a way as to form a coolant barrier together with the tool shank and with that housing.*

*14. A clamping device according to claim 13, characterized in that the collet chuck or clamping sleeve has radial slots open on the tool side and has radial intermediate slots, in alternating sequence.*

* * * * *